US006192162B1

(12) United States Patent
Hamilton, Jr. et al.

(10) Patent No.: US 6,192,162 B1
(45) Date of Patent: Feb. 20, 2001

(54) EDGE ENHANCING COLORED DIGITAL IMAGES

(75) Inventors: John F. Hamilton, Jr.; James E. Adams, Jr., both of Rochester, NY (US)

(73) Assignee: Eastman Kodak Company, Rochester, NY (US)

( * ) Notice: Under 35 U.S.C. 154(b), the term of this patent shall be extended for 0 days.

(21) Appl. No.: 09/135,306

(22) Filed: Aug. 17, 1998

(51) Int. Cl.[7] ........ G06K 9/40

(52) U.S. Cl. ........ 382/266; 382/275; 358/463

(58) Field of Search ........ 382/162, 195, 382/199, 266, 275, 205, 254, 263; 358/463, 532, 909.1

(56) References Cited

U.S. PATENT DOCUMENTS

| | | | |
|---|---|---|---|
| 3,971,065 | 7/1976 | Bayer . | |
| 5,212,740 * | 5/1993 | Paek et al. | 382/266 |
| 5,652,621 | 7/1997 | Adams, Jr. et al. . | |
| 5,719,967 * | 2/1998 | Sekine | 382/266 |

* cited by examiner

*Primary Examiner*—Thomas D. Lee
(74) *Attorney, Agent, or Firm*—Raymond L. Owens

(57) ABSTRACT

A method for edge enhancing a digital image having pixels includes computing parameters for at least two orientations for each pixel in the stored digital image; using the computed parameters to form a classifier value for each such orientation and using such classifiers to determine the pixel classification based on such classifiers; and deriving a boost value according to the determined pixel classification.

5 Claims, 5 Drawing Sheets

| | | |
|---|---|---|
| $V_1$ | $V_2$ | $V_3$ |
| $V_4$ | $V_5$ | $V_6$ |
| $V_7$ | $V_8$ | $V_9$ |

| 0 | -1 | 0 | -1 | 0 |
|---|---|---|---|---|
| 0 | 0 | -2 | 0 | 0 |
| 0 | 2 | 4 | 2 | 0 |
| 0 | 0 | -2 | 0 | 0 |
| 0 | -1 | 0 | -1 | 0 |

FIG. 6A

| 0 | 0 | 0 | 0 | 0 |
|---|---|---|---|---|
| -1 | 0 | 2 | 0 | -1 |
| 0 | -2 | 4 | -2 | 0 |
| -1 | 0 | 2 | 0 | -1 |
| 0 | 0 | 0 | 0 | 0 |

FIG. 6B

| 0 | -1 | 0 | 0 | 0 |
|---|---|---|---|---|
| -1 | -2 | 0 | 2 | 0 |
| 0 | 0 | 4 | 0 | 0 |
| 0 | 2 | 0 | -2 | -1 |
| 0 | 0 | 0 | -1 | 0 |

FIG. 6C

| 0 | 0 | 0 | -1 | 0 |
|---|---|---|---|---|
| 0 | 2 | 0 | -2 | -1 |
| 0 | 0 | 4 | 0 | 0 |
| -1 | -2 | 0 | 2 | 0 |
| 0 | -1 | 0 | 0 | 0 |

FIG. 6D

EDGE ENHANCING COLORED DIGITAL IMAGES

FIELD OF THE INVENTION

The invention relates to edge enhancing colored digital images.

BACKGROUND OF THE INVENTION

Currently, colored digital images are derived through various means including digital cameras and the digital scanning of film images. Many times the sharpness of a colored digital image is degraded by optical elements or by irregularities in the image sensor. For these reasons, it is often desirable to sharpen the color image after it has been converted to a digital representation. However, these digital images also tend to be noisy. For example, one noise source is sensor noise in both digital cameras and film scanners.

The problem with sharpening a noisy image is well known. Noise manifests itself as erroneous image fluctuations which are usually difficult to distinguish from the subtle image features which need sharpening. Thus, conventional sharpening processes amplify noise as well as image content. What is needed is a process that can sharpen image detail without further accentuating any noise present in the image.

Another consideration is that interpolated color images from digital cameras may have differences in edge sharpness depending on edge orientation and the details of the color interpolation algorithm. As a result, different regions of a colored digital image may require different levels of sharpening depending on edge orientation.

SUMMARY OF THE INVENTION

It is an object of the present invention to provide a method which enhances edges in digital color images.

This object is achieved by a method for edge enhancing a digital image having pixels comprising the steps of:

a) computing parameters for at least two orientations for each pixel in the stored digital image;

b) using the computed parameters to form a classifier value for each such orientation and using such classifiers to determine the pixel classification based on such classifiers; and c) deriving a boost value according to the determined pixel classification.

ADVANTAGES

It has been previously stated that colored digital images are often noisy and in need of sharpening. Furthermore, different regions of a colored digital image from a digital camera need different levels of sharpening depending on the edge orientation. The present invention addresses these needs by classifying the edge content at each pixel as a function of the luminance channel of the image, and by applying the corresponding edge boost kernel.

Because each classification indicates a specific edge orientation, it is possible to create a corresponding edge boost kernel which is sensitive to image variations in one direction while simultaneously being insensitive to image variations in another direction. Thus, it is possible to sharpen edges while simultaneously diminishing the influence of noise.

Also, because classification identifies edge orientation, digital camera images can be given greater or lesser amounts of sharpening depending on properties of the color interpolation algorithm. The spatial frequency response of the edge sharpening process may also be adjusted as a function of edge orientation.

BRIEF DESCRIPTION OF THE DRAWINGS

FIGS. 6A–D depict edge boost kernels to compute edge boost values in accordance with the present invention.

DETAILED DESCRIPTION OF THE INVENTION

Since single-sensor electronic cameras employing color filter arrays are well known, the present description will be directed in particular to elements forming part of, or cooperating more directly with, apparatus and method in accordance with the present invention. Elements not specifically shown or described herein may be selected from those known in the art.

Figure 1:
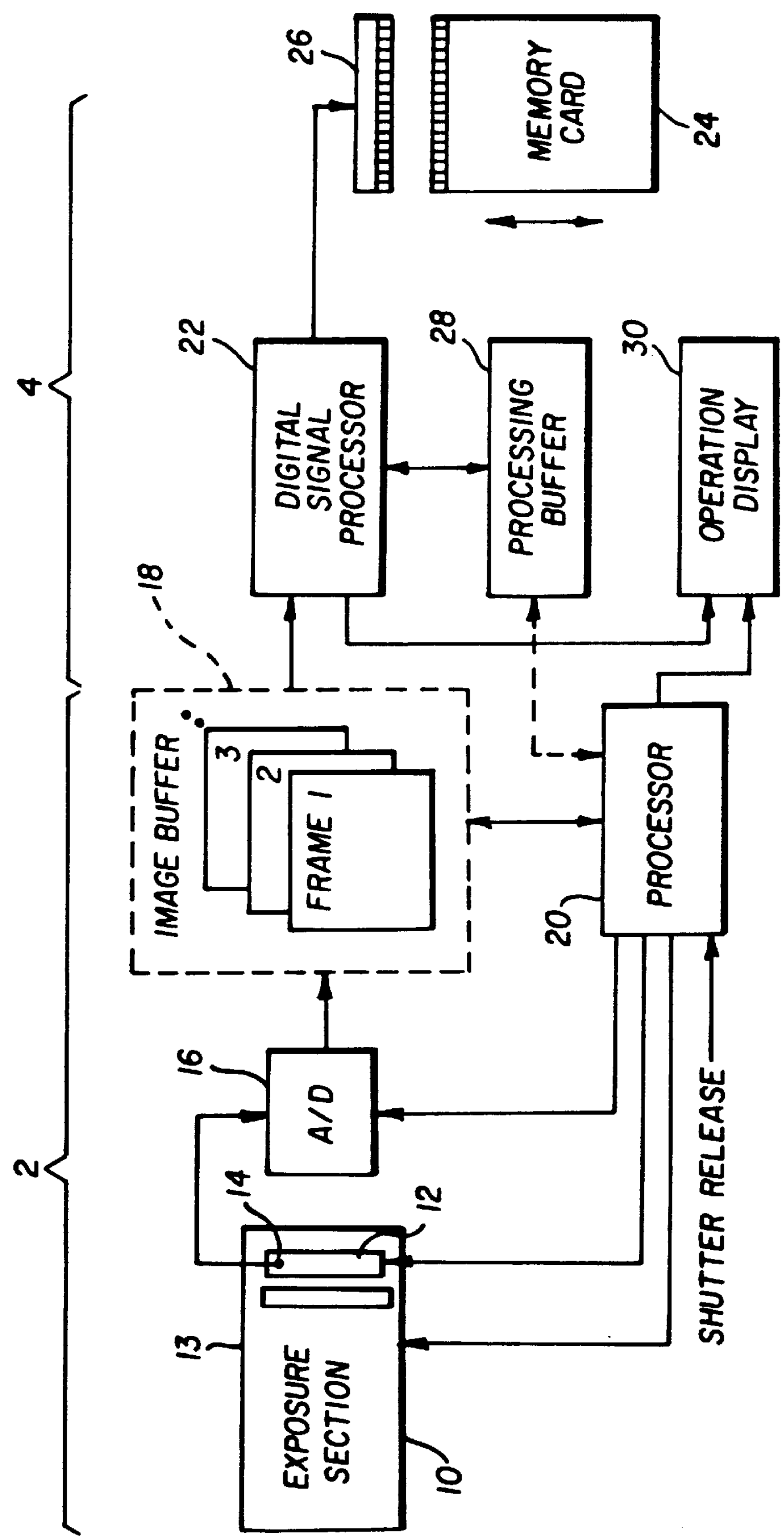
FIG. 1 is a block diagram of an electronic still camera employing edge boost processing according to the invention.
Figure 2:
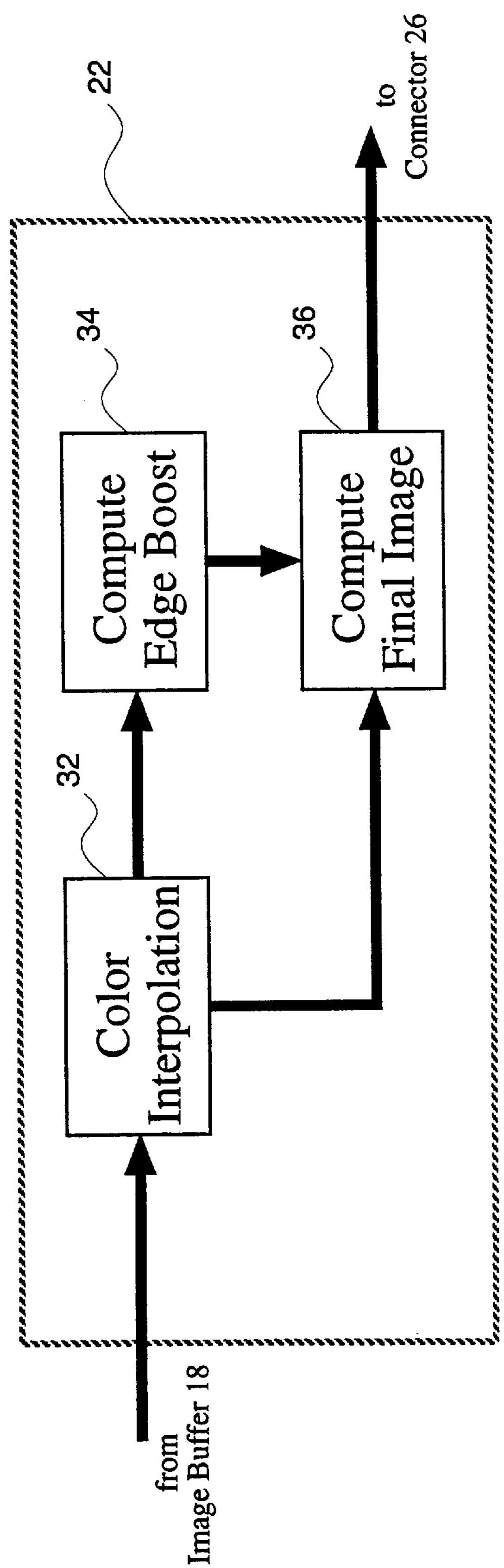
FIG. 2 shows a detailed block diagram of the digital signal processor shown in FIG. 1.

Referring initially to FIGS. 1 and 2, an electronic still camera is divided generally into an input section 2 and an interpolation and recording section 4. The input section 2 includes an exposure section 10 for directing image light from a subject (not shown) toward an image sensor 12. Although not shown, the exposure section 10 includes conventional optics for directing the image light through a diaphragm, which regulates the optical aperture, and a shutter, which regulates exposure time. The image sensor 12, which includes a two-dimensional array of photosites corresponding to picture elements of the image, is a conventional charge-coupled device (CCD) using either well-known interline transfer or frame transfer techniques. The image sensor 12 is covered by a color filter array (CFA) 13, known as the Bayer array, which is described in U.S. Pat. No. 3,971,065 and herewith incorporated by reference. In the Bayer geometry each color covers a photosite, or picture element (pixel), of the sensor. In particular, chrominance colors (red and blue) are interspersed among a checkerboard pattern of luminance colors (green). The image sensor 12 is exposed to image light so that analog image charge information is generated in respective photosites. The charge information is applied to an output diode 14, which converts the charge information to analog image signals corresponding to respective picture elements. The analog image signals are applied to an A/D converter 16, which generates a digital image signal from the analog input signal for each picture element. The digital signals are applied to an image buffer 18, which may be a random access memory (RAM) with storage capacity for a plurality of still images.

A control processor 20 generally controls the input section 2 of the camera by initiating and controlling exposure (by operation by the diaphragm and shutter (not shown) in the exposure section 10), by generating the horizontal and vertical clocks needed for driving the image sensor 12 and for clocking image information therefrom, and by enabling the A/D converter 16 in conjunction with the image buffer 18 for each signal segment relating to a picture element. (The control processor 20 would ordinarily include a microprocessor coupled with a system timing circuit.) Once a certain number of digital image signals have been accumulated in the image buffer 18, the stored signals are applied to a digital signal processor 22, which controls the throughput processing rate for the interpolation and recording section 4 of the camera. The digital signal processor 22 applies an interpolation algorithm to the digital image signals, and sends the interpolated signals to a conventional, removable memory card 24 via a connector 26.

Since the interpolation and related processing ordinarily occurs over several steps, the intermediate products of the processing algorithm are stored in a processing buffer 28. (The processing buffer 28 may also be configured as part of the memory space of the image buffer 18.) The number of image signals needed in the image buffer 18 before digital processing can begin depends on the type of processing, that is, for a neighborhood interpolation to begin, a block of signals including at least a portion of the image signals comprising a video frame must be available. Consequently, in most circumstances, the interpolation may commence as soon as the requisite block of picture elements is present in the buffer 18.

The input section 2 operates at a rate commensurate with normal operation of the camera while interpolation, which may consume more time, can be relatively divorced from the input rate. The exposure section 10 exposes the image sensor 12 to image light for a time period dependent upon exposure requirements, for example, a time period between 1/1000 second and several seconds. The image charge is then swept from the photosites in the image sensor 12, converted to a digital format, and written into the image buffer 18. The driving signals provided by the control processor 20 to the image sensor 12, the A/D converter 16 and the buffer 18 are accordingly generated to achieve such a transfer. The processing throughput rate of the interpolation and recording section 4 is determined by the speed of the digital signal processor 22.

One desirable consequence of this architecture is that the processing algorithm employed in the interpolation and recording section may be selected for quality treatment of the image rather than for throughput speed. This, of course, can put a delay between consecutive pictures which may affect the user, depending on the time between photographic events. This is a problem since it is well known and understood in the field of electronic imaging that a digital still camera should provide a continuous shooting capability for a successive sequence of images. For this reason, the image buffer 18 shown in FIG. 1 provides for storage of a plurality of images, in effect allowing a series of images to "stack up" at video rates. The size of the buffer is established to hold enough consecutive images to cover most picture-taking situations.

An operation display panel 30 is connected to the control processor 20 for displaying information useful in operation of the camera. Such information might include typical photographic data, such as shutter speed, aperture, exposure bias, color balance (auto, tungsten, fluorescent, daylight), field/frame, low battery, low light, exposure modes (aperture preferred, shutter preferred), and so on. Moreover, other information unique to this type of camera is displayed. For instance, the removable memory card 24 would ordinarily include a directory signifying the beginning and ending of each stored image. This would show on the display panel 30 as either (or both) the number of images stored or the number of image spaces remaining, or estimated to be remaining.

Referring to FIG. 2, the digital signal processor block 22 is described in greater detail. The color interpolation block 32 creates a complete color image from the digitized color filter array data provided by image buffer block 18. Methods of color interpolation are well known (see, for example, commonly assigned U.S. Pat. No. 5,652,621) for such color filter arrays as the Bayer pattern (U.S. Pat. No. 3,971,065). The compute edge boost block 34 computes an edge boost value for each pixel in the image and passes these values to the compute final image block 36 which combines the edge boost values with the interpolated color values from block 32.

Figure 3:
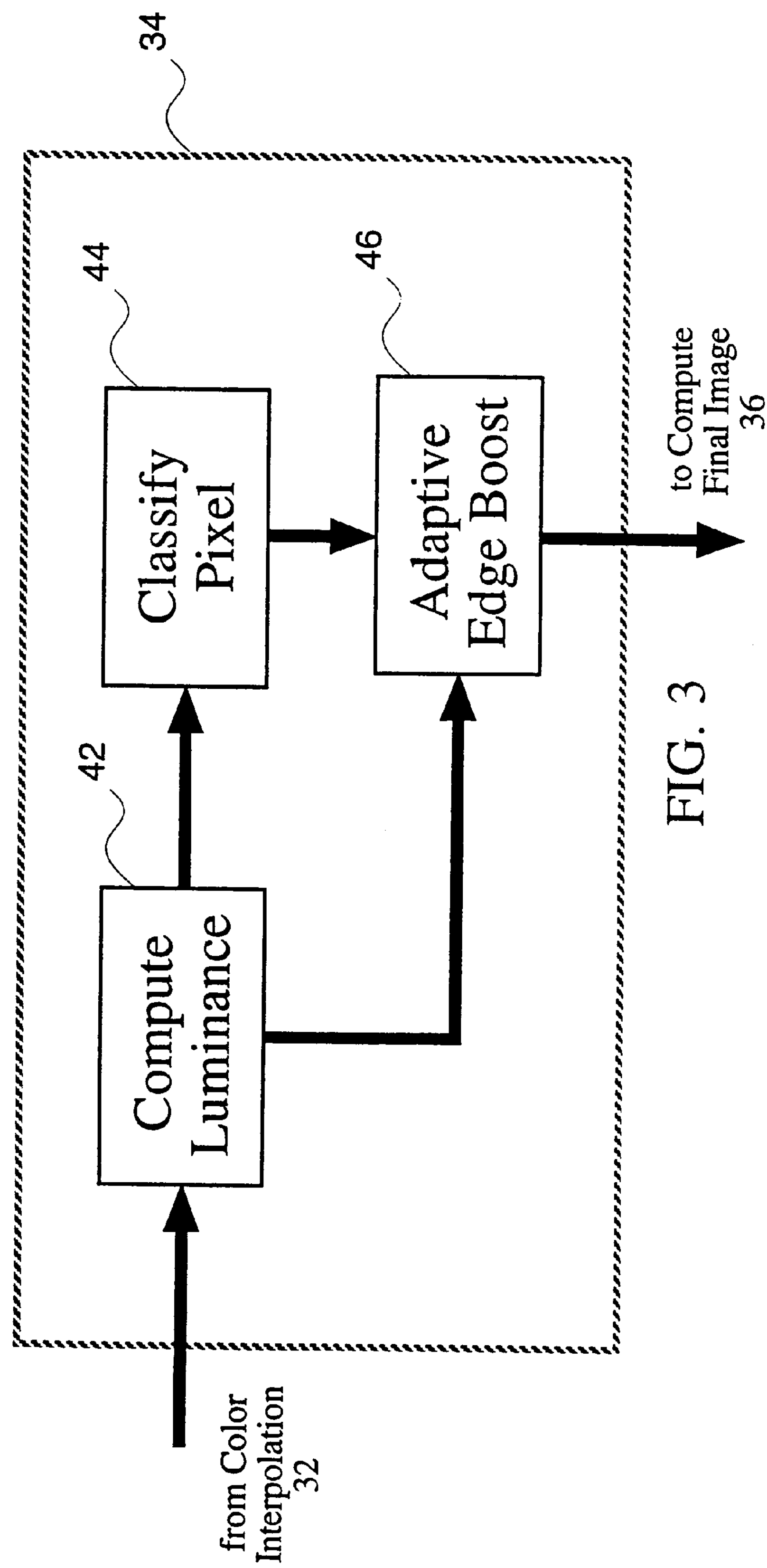
FIG. 3 shows a detailed block diagram of the compute edge boost block shown in FIG. 2.

Referring to FIG. 3, the compute edge boost block 34 is shown in greater detail. A luminance record of the full-color image is created in the compute luminance block 42. This luminance record can be simply the green channel of the image or a computed value using any of a number of methods in the prior art. As an example, a typical way of calculating a luminance value for a given image pixel would be $$V=(3R+6G+B)/10$$

where V is the computed luminance, R is the red value of the pixel, G is the green value of the pixel, and B is the blue value of the pixel. Regardless of the method chosen, block 42 will produce a luminance value V for each pixel in the image. Depending on surrounding luminance values, each pixel in the image is now classified as belonging to one of five classes in the classify pixel block 44. This classification is accomplished by calculating a plurality of classifier values in the calculate classifiers block 52 of FIG. 4. Each classifier value is computed using the luminance value of the pixel in question and one or more of the luminance values from adjacent pixels in the image. This collection of the pixel in question and its neighbors is called the pixel neighborhood.

Figures 4, 5:
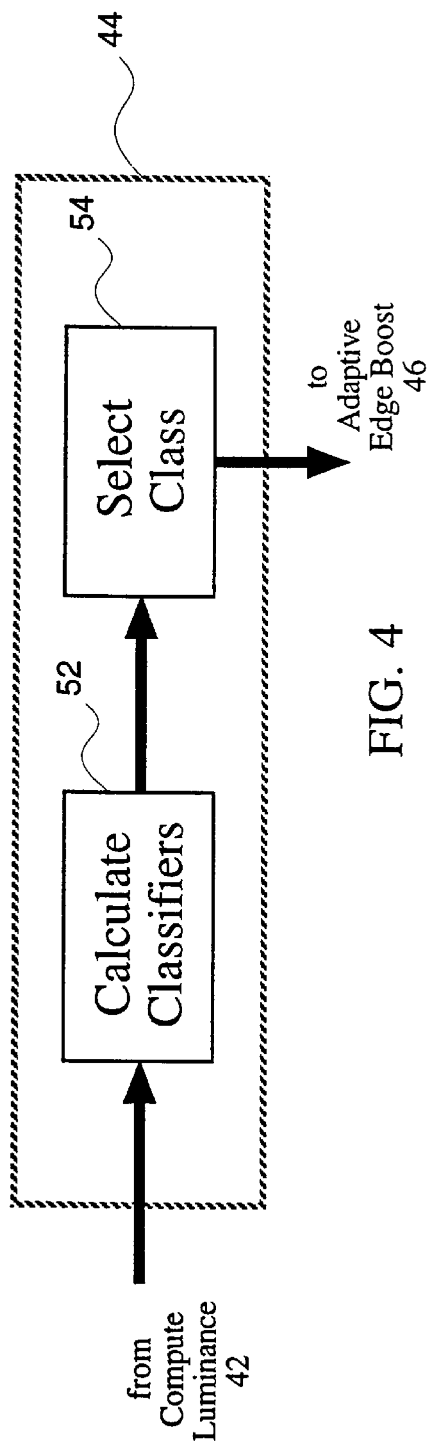
FIG. 4 shows a detailed block diagram of the classify pixel block shown in FIG. 2.
FIG. 5 depicts a typical 3×3 luminance pixel neighborhood.

FIG. 5 depicts a typical 3×3 luminance pixel neighborhood. In this embodiment, the four classifiers that need to be calculated are $$H=2ABS(V4-V6)+ABS(2V5-V4-V6),$$

$$V=2ABS(V2-V8)+ABS(2V5-V2-V8),$$

$$S=2ABS(V3-V7)+ABS(2V5-V3-V7),$$

and $$B=2ABS(V1-V9)+ABS(2V5-V1-V9),$$

where ABS is the absolute value. In the select class block 54, the central pixel (having luminance value V5) is placed into one of five classes in the following way. The first step is to determine if the pixel neighborhood contains any edges in the luminance record or if the pixel neighborhood is in a "flat" region of the image. This is done by testing whether the H and V classifier values are both less than a predetermined threshold value, i.e.,

```
IF ((H<threshold ) AND (V<threshold))
   THEN neighborhood is "flat"
ELSE neighborhood has one or more edges.
```

The predetermined threshold value is chosen by processing a number of test images and seeing which threshold value does the best job of separating "flat"pixel neighborhoods from pixel neighborhoods that contain edges. "Flat" is one of the possible classes that can be assigned to the pixel (V5) in question. If a pixel does not meet the conditions of a "flat" classification, then the four classifiers, H, V, S, and B, are examined to determine which has the smallest value. The classes "horizontal", "vertical", "slash", and "backslash" are assigned according to the following test:

minimum=MIN (H, V, S, B)

IF (H=minimum)

THEN neighborhood is of class "horizontal"

ELSE IF (V=minimum)

THEN neighborhood is of class "vertical"

ELSE IF (S=minimum)

THEN neighborhood is of class "slash"

ELSE IF (B=minimum)

THEN neighborhood is of class "backslash"

Note that MIN is the minimum value. The last ELSE IF test is not necessary for if a neighborhood is not "horizontal", "vertical", nor "slash", then it must be "backslash". The classification of each pixel is then provided to the adaptive edge boost block 46.

Except for the "flat" classification, which receives no boost at all, each pixel classification has a corresponding edge boost kernel which is to be applied to the luminance channel. As an example, the classes "horizontal", "vertical", "slash", and "backslash" can have the boost kernels shown in FIGS. 6A–D, respectively. These are zero-sum kernels that take luminance value differences across an edge (for edge boost) and sums of luminance values along an edge (for noise filtration). Because the kernel is adaptively chosen based on edge orientation, the edge boost kernel can achieve both edge sharpening and noise immunity at the same time.

In the compute final image block 36, the edge boost code values are added to each of the red, green, and blue color channels. This completes the edge boost application.

The algorithms for performing the method of the present invention can be stored on a computer readable storage medium. The computer readable storage medium includes, for example; magnetic storage media such as magnetic disc (such as a floppy disc) or magnetic tape; optical storage media such as optical disk, optical tape, or machine readable bar code; solid state electronic storage devices such as random access memory (RAM), or read only memory (ROM); or any other physical device or medium employed to store a computer program.

The invention has been described in detail with particular reference to certain preferred embodiments thereof, but it will be understood that variations and modifications can be effected within the spirit and scope of the invention.

PARTS LIST

2 input section
4 recording section
10 exposure section
12 image sensor
13 color filter array
14 output diode
16 A/D converter
18 image buffer
20 control processor
22 digital signal processor
24 removable memory card
26 connector
28 processing buffer
30 display panel
32 color interpolation block
34 compute edge boost block
36 compute final image block
42 compute luminance block
44 classify pixel block
46 adaptive edge boost block
52 calculate classifiers block
54 select class block

What is claimed is:

1. A method for edge enhancing a digital color image having color pixels wherein such colored pixels are used to provide a channel including high spatial frequency content, such method comprising the steps of:

a) computing parameters for at least two orientations for each pixel in the stored digital image;

b) using the computed parameters to form a classifier value for each such orientation and using such classifiers to determine the pixel classification based on such classifiers, wherein there are four classifiers each having a value associated with each pixel which are horizontal, vertical, slope 1 diagonal, and slope −1 diagonal; and c) deriving a boost value as a function of the high spatial frequency content channel according to the determined pixel classification, wherein such predetermined pixel classification is provided by comparing the horizontal and vertical classifiers to determine if they are less than a predetermined threshold and, if so, classifying the pixel as having a flat orientation, but when above such threshold, classifying according to the smallest classifier value and using such selected orientation to perform smoothing.

2. A method for edge enhancing a digital color image having color pixels wherein such colored pixels are used to provide a channel corresponding to luminance such as green or a computed luminance channel including high spatial frequency content, such method comprising the steps of:

a) computing parameters for at least two orientations for each pixel in the stored digital image;

b) using the computed parameters to form a classifier value for each such orientation and using such classifiers to determine the pixel classification based on such classifiers wherein such pixel classification is determined by comparing the horizontal and vertical classifiers to determine if they are less than a predetermined threshold and, if so, classifying the pixel as having a flat orientation, but when above such threshold, classifying according to the smallest classifier value and using such selected orientation to perform smoothing; and c) deriving a boost value as a function of the high spatial frequency content channel according to the determined pixel classification by:

i) providing a plurality of boost kernels wherein there is one boost kernel which corresponds to each classification;

ii) applying the high spatial frequency content channel to the boost kernel corresponding to the determined classification to provide boost value for each pixel; and modifying pixel values of the digital image according to corresponding boost values to provide an edge enhanced digital image.

3. The method of claim 2, wherein the digital image has red, green, and blue pixels and the high spatial frequency content channel corresponds to the green pixels.

4. The method of claim 2 wherein there are four classifiers each having a value associated with each pixel which are horizontal, vertical, slope 1 diagonal, and slope −1 diagonal.

5. The method of claim 2 wherein the pixel classification is a function only of neighboring luminance pixel values.

* * * * *